July 18, 1950 — H. M. TUCKER — 2,515,278
SYNCHRONOUS MOTOR DEMONSTRATOR
Filed April 4, 1949 — 4 Sheets-Sheet 3
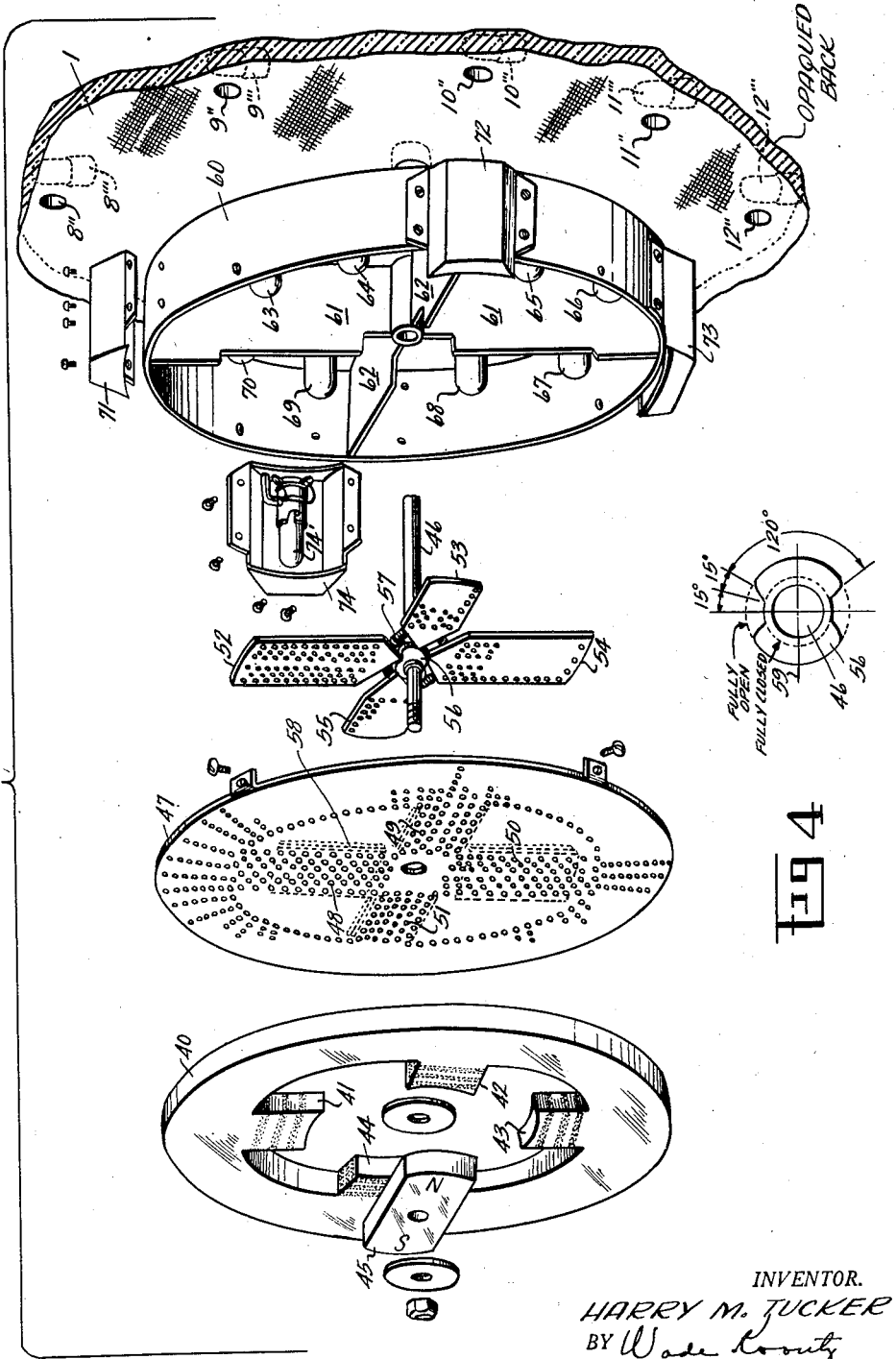
INVENTOR.
HARRY M. TUCKER
BY Wade Koontz
ATTORNEY and
James S. Shannon
AGENT

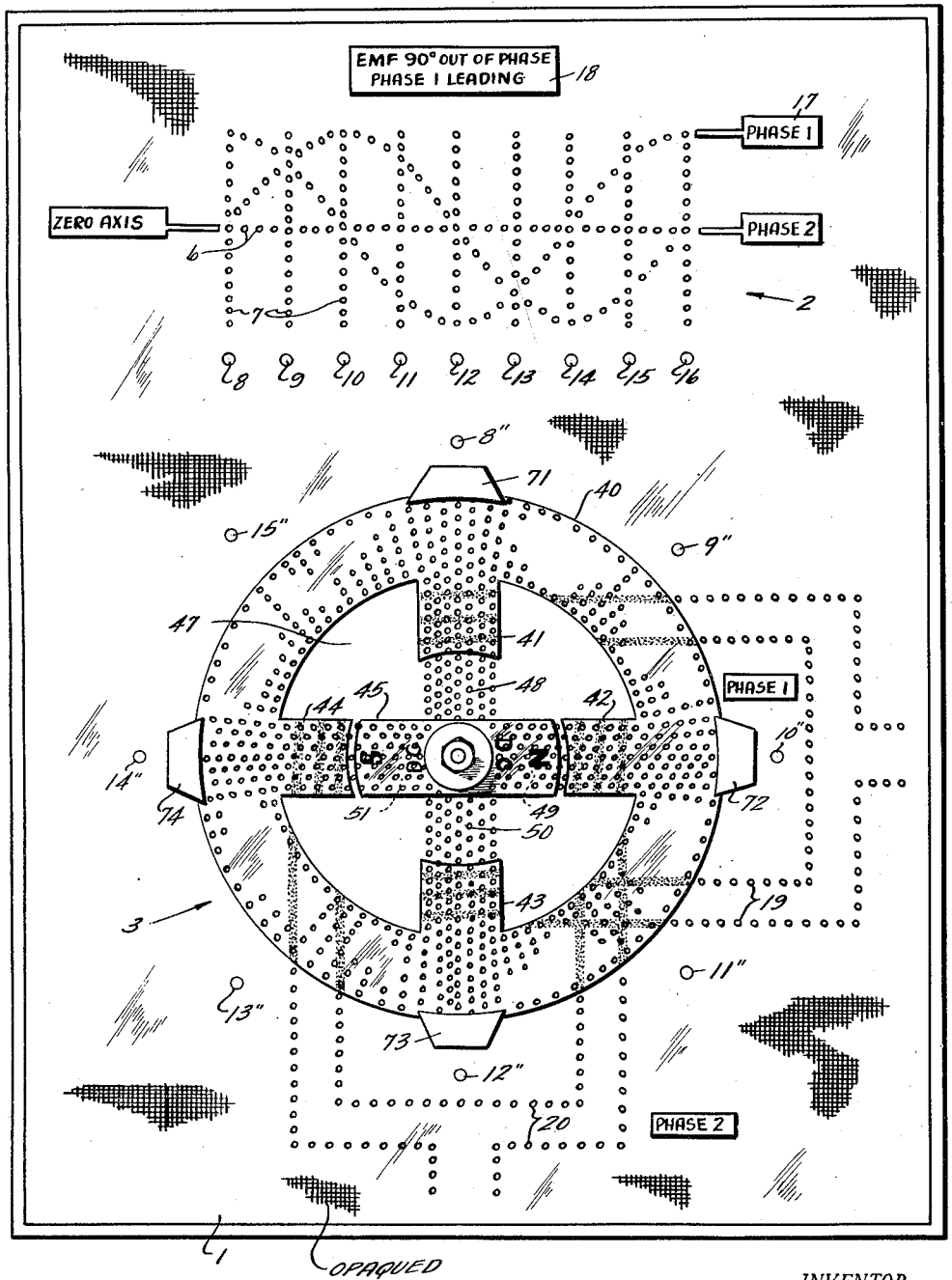

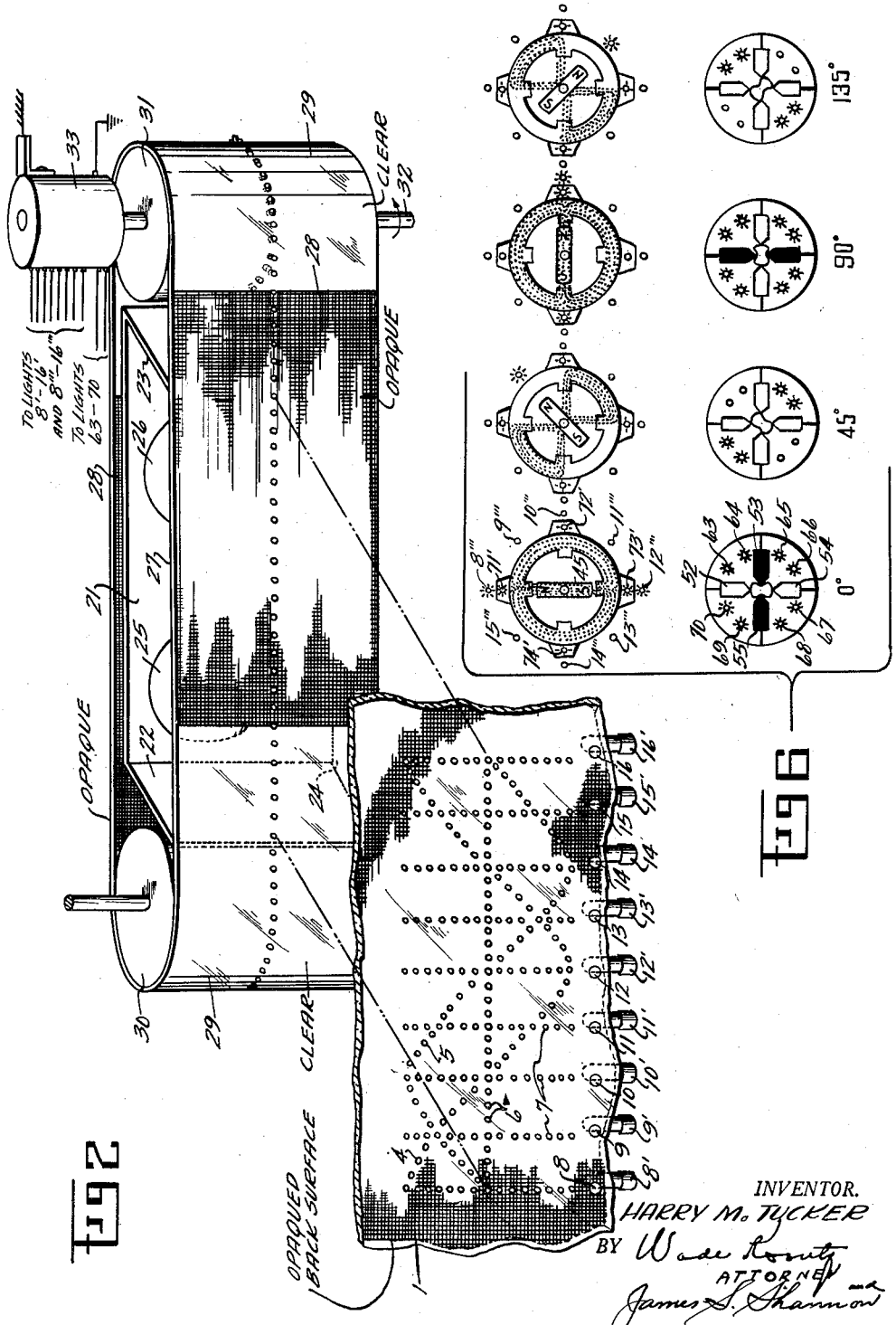

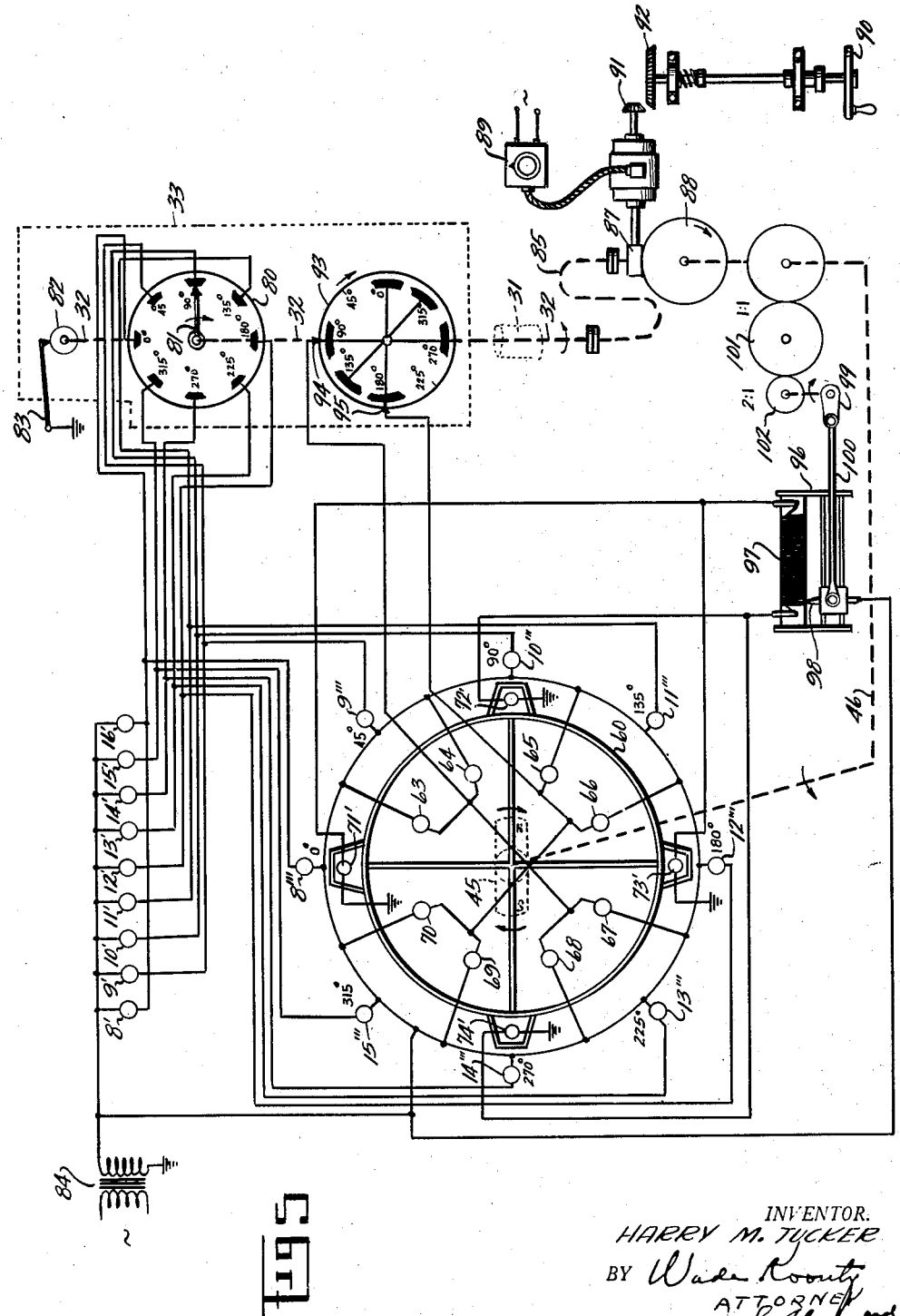

Patented July 18, 1950

2,515,278

UNITED STATES PATENT OFFICE 2,515,278

SYNCHRONOUS MOTOR DEMONSTRATOR

Harry M. Tucker, Dayton, Ohio

Application April 4, 1949, Serial No. 85,401

5 Claims. (Cl. 35—13)

(Granted under the act of March 3, 1883, as amended April 30, 1928; 370 O. G. 757)

The invention described herein may be manufactured and used by or for the Government for governmental purposes without payment to me of any royalty thereon.

This invention relates to training apparatus and particularly to the visual type of training aid which may be used in instructing a large class.

It is the object of the invention to provide a training aid for clearly and simply demonstrating the theory of operation of a synchronous motor.

Briefly, in accordance with the invention, apparatus is provided for illustrating (1) the voltage waves and the phase relation therebetween applied to a synchronous motor and (2) the flux distribution in a synchronous motor at various points of the applied voltage waves. The voltage waves are portrayed by transparent traces on an opaque plate or panel with a light source and an interposed movable masking device located behind the panel so that the variations of the waves with respect to time are illustrated. The flux distribution in the motor is illustrated by means of a disc of opaque material in which the cross-sectional area of the core and associated salient poles of the stator, in a plane perpendicular to the shaft, is perforated to permit the passage of light. Each of the sectoral areas of the disc between adjacent poles is illuminated from the rear by a separate controllable light source and cam operated shutters are interposed between the perforated poles and the light sources. A stator of transparent material conforming to the cross-sectional area perpendicular to the shaft of the core and associated poles is placed over the perforations in the disc and a rotor of transparent material is arranged to rotate in the space between the poles to simulate the rotor of a synchronous motor. By properly coordinating the position of the rotor with the action of the shutters, the switching of the lights behind the sectoral areas of the disc and the position of the above mentioned movable mask used in conjunction with the voltage wave representing apparatus, the light passing through the perforated areas is made to represent the flux distribution in a synchronous motor for various points on the voltage waves and various positions of the rotor.

The details of a preferred embodiment of the invention are shown in the accompanying drawings in which:

Fig. 1 shows the front panel of the demonstrator as seen by the student,

Fig. 2 shows the voltage wave portraying device used in the demonstrator,

Fig. 3 shows the flux indicating device used in the demonstrator,

Fig. 4 shows the design of the cam for actuating the shutters in the flux indicating device, Fig. 5 shows the details of the commutator, the driving mechanism and the wiring diagram of the demonstrator, and Fig. 6 shows the flux representations produced by the flux indicating device at various points of the voltage waves.

Referring to Fig. 1 the front panel 1 of the demonstrator contains the voltage wave indicator generally referred to by reference numeral 2 and the flux indicator generally referred to by reference numeral 3. In the embodiment shown the panel 1 is made of a clear transparent synthetic resin coated on the back surface with a black opaque paint with the paint removed wherever it is desired for light to pass through the panel. In this way two sine waves 90° apart in phase are represented in the voltage wave indicator 2 by removing the paint at successive small circular areas along the waves. In a similar way the zero axis 6 and vertical lines 7 are delineated on the panel 1. The lines 7 are located 45 electrical degrees apart so that one complete cycle of each of waves 4 and 5 is shown. Transparent circular areas 8 through 16 are positioned below lines 7 and are backed by lights 8' through 16' (Fig. 2) respectively which shine through these areas to indicate various points on the voltage waves, as will be seen later. Various legends on the panel 1, such as 17 and 18, are formed by removing the opaque paint and applying the desired lettering in the transparent areas. In connection with flux indicator 3 the circuits connecting each of the voltages shown in the wave indicator 2 to the armature windings of the motor are shown in dotted outlines 19 and 20 formed by removal of small circular areas of paint at regular intervals along the conductors as in the case of waves 4 and 5 and lines 6 and 7 of wave indicator 2. Means, not shown, are located behind panel 1 for continuously illuminating the transparent areas of the legends and the circuits 19 and 20.

The wave indicator 2 is shown more completely in Fig. 2. Positioned directly back of plate 1, but shown displaced therefrom in the figure for the sake of clarity, is a reflector having back 21, sides 22 and 23 and bottom 24. The height and length of the reflector is sufficient to just cover the area of plate 1 occupied by waves 4 and 5 and lines 6 and 7 so that this area may be illuminated by light sources 25 and 26 located in the reflector. Belt 21, having opaque portions 28 and transparent portions 29, each equal in length to one wave length of waves 4 and 5, is supported by cylinders 30 and 31 and interposed between the open end of the reflector and panel 1 so as to control the light falling on the back of the panel from sources 25 and 26. The center of the belt is perforated and these perforations engage teeth on drum 31 so that a fixed relationship exists between the belt and the angular position of shaft 32 on which cylinder 31 is mounted. The diameter of cylinder 31 is such that the belt 27 moves a distance equal to one wavelength of waves 4 and 5 on panel 1 during one revolution of shaft 32. As an opaque portion of belt 27 moves from left to right uncovering the reflector the waves 4 and 5 are progressively illuminated from left to right. When full illumination of waves 4 and 5 is obtained the next opaque section begins to move across the reflector progressively darkening the waves from left to right. As the result of this process complete cycles of each of waves 4 and 5 appear to the observer to move from left to right across the panel 1. The commutator 33, the details of which are shown in Fig. 5, is driven by shaft 32 and, as one of its functions, operates to momentarily energize each of lights 8' through 16' when a dividing line between a clear and an opaque section of belt 27 passes a corresponding vertical line 7. When belt 27 is in motion the holes through the center thereof register periodically with the holes in zero reference line 6 so that the location of the line is always apparent even when the reflector is covered by an opaque portion of the belt.

As seen above, the wave indicator 2 portrays a two-phase voltage in which the phases are 90 electrical degrees apart. The flux indicator 3, shown in Figs. 1 and 3, is in the form of a simple two-phase synchronous motor designed to operate with a two-phase voltage of the type portrayed. The stator or armature core of the motor is represented by a ring 40 of clear plastic having salient poles 41, 42, 43 and 44. The phase 1 winding is mounted on poles 41 and 43 and the phase 2 winding on poles 42 and 44, these windings being illustrated by etching on the clear plastic. Since the space separation of these two windings is the same as the electrical separation of the voltages applied thereto, namely 90°, the fluxes produced by the two windings combine to produce a rotating two-pole magnetic field. The speed of rotation of this field is $$\frac{120f}{n}$$

revolutions per minute where $f$ is the frequency of the two-phase voltages and $n$ is the number of poles in the resultant field. For $F=60$ C. P. S. the speed would be $$\frac{120 \times 60}{2}$$

or 3600 R. P. M. It is of course intended that the demonstrator operate at a much lower speed to permit observation.

The rotor or field core 45 is made of the same clear plastic material as the stator and has two salient poles marked "N" and "S" which, in an actual motor of this type, align with the two poles of the rotating field and move therewith so that the rotor revolves at the speed of the field, usually referred to as synchronous speed. The rotor fields of synchronous motors are usually energized by direct current and to illustrate this the letters "DC" are also etched on the clear plastic. Provision is made for mounting the rotor on the end of shaft 46.

The transparent stator 40 and rotor 45 are backed by a disc 47 of opaque material such as metal. The area of plate 47 located under the outer ring of stator 40 is perforated, and also four strips of perforations 48, 49, 50 and 51, of about the same width as and centered on poles 41, 42, 43 and 44, extend radially toward the center of disc 47. Positioned directly behind strips 48—51 are shutters 52—55, respectively, each perforated in the same pattern as the perforated strips. The shutters are actuated in a radial direction by cam 56 mounted on shaft 46. When the shutters are on the high portion of the cam the perforations therein register with the corresponding perforations in disc 47 to permit the passage of light, and when on the low portion of the cam the perforations are out of register and the passage of light is blocked. The shutters are kept in engagement with the cam by means of an annular spring 57 which engages a small post (not shown) extending rearwardly from each shutter. The shutters are kept in alignment by guides on the back of disc 47 as shown at 58.

The design of the cam is shown in Fig. 4, the cam being drawn to a larger scale in this figure. The rotor 40 is mounted on shaft 46 with its polar axis in alignment with the axis 59 of the cam as shown in Fig. 4. The design is such that shutters 52 and 54 are open and shutters 53 and 55 closed when the rotor is within about 15° either side of the vertical position, shutters 53 and 55 are open and shutters 52 and 54 closed when the rotor is within about 15° either side of horizontal, and all shutters are open when the rotor is within about 15° either side of an angular position intermediate vertical and horizontal. For all other positions of the rotor the shutters are in the process of opening or closing.

Situated behind disc 47 and the shutters is a circular reflector assembly 60 divided into four quadrants by vertical light barrier 61 and horizontal light barrier 62. Small light bulbs 63—70 are positioned within these quadrants, two to each quadrant. When the two-phase voltages in wave indicator 2 has the values shown opposite indicator light 8—8' (Figs. 1 and 2) the current in the phase 1 winding of the motor is at a maximum and that in the phase 2 winding is zero. For this condition the total flux of the revolving field is generated by the phase 1 winding and passes through salient poles 41 and 43. To illustrate this condition shutters 52 and 54 are open, shutters 53 and 55 closed, and lights 63 through 70 energized so that light passes through the perforations in strips 48 and 50 and through the perforations in both the right and left perforated semicircles of disc 47 representing the stator core. Assuming the phase 1 winding to be in such a direction as to make pole 41 a south pole and pole 43 a north pole, the rotor will now be in a vertical position with the "N" pole directly under salient pole 41.

Forty-five electrical degrees later the two voltages have the value shown opposite the 9—9' indicator light in Figs. 1 and 2. For this condition the current in the phase 1 winding is reduced and the current in the phase 2 winding increased until the two are equal, so that equal fluxes are produced by each of the windings. To illustrate this condition all shutters are opened but only lights 65, 66, 69 and 70 are energized so that light passes through the upper left and lower right quadrants of the circular perforations in disc 47 and through the left half of perforated strip 48, the upper half of perforated strip 51, the lower half of perforated strip 49 and the right half of perforated strip 50. For this condition poles 41 and 42 have south polarity and poles 43 and 44 north polarity, and the resultant field is rotated 45° clockwise from its preceding vertical position. To agree with the new position of the field the rotor is likewise rotated clockwise 45° from its preceding position. The action of barriers 61 and 62 prevents complete illumination of the perforated strips, which serves to indicate a smaller value of flux produced by the two windings for this condition as compared with the flux produced by the phase 1 winding in the preceding condition in which the current in this winding had its maximum value.

Forty-five electrical degrees later, as may be seen opposite the indicator light 10—10' in Figs. 1 and 2, the current in the phase 2 winding has its maximum value and that in the phase 1 winding is zero. To illustrate this condition the shutters 53 and 55 are open, shutters 52 and 53 closed and lights 63 through 70 energized. For this condition the resultant field is in line with poles 42 and 44 as is indicated by light passing through the perforations of strips 49 and 51 and the upper and lower semicircles of perforations in disc 47. The rotor is likewise advanced 45° more, by the rotation of shaft 46, into alignment with the field between poles 42 and 44.

The various flux presentations produced by the flux indicator, including the three described above, are shown in Fig. 6, which also shows the action of the shutters and lights. In this figure white indicates an open and black a closed shutter. The angular position legends indicate the angular positions of the "N" pole of the rotor as seen in Figs. 1 and 3. The presentations for the 180°, 225°, 270° and 315° positions are the same as for the 0°, 45°, 90° and 135° positions, respectively.

In order to accentuate the variation in flux density in the salient poles 41, 42, 43 and 44, reflectors 71, 72, 73 and 74 containing small lamps 71', 72', 73' and 74' (the first three not shown) are positioned on the outside of reflector assembly 60 opposite each of the salient poles and designed to direct light into the edge of stator 40 directly opposite the poles. Means, to be described in connection with Fig. 5 are provided to effect maximum brightness in lamps 71' and 73' and minimum brightness in lamps 72' and 74' when the rotor is in a vertical position, maximum brightness in lamps 72' and 74' and minimum brightness in lamps 71' and 73' when the rotor is in its horizontal position, and equal but less than maximum brightness in all lamps when the rotor is in a diagonal position intermediate the vertical and horizontal positions. The transition from full to minimum brightness is uniform and gives the appearance of a varying flux density in the poles as the rotor revolves.

The transparent areas 8'' through 15'', backed by lights 8''' through 15''' (the latter three not shown), are positioned at 45° intervals about the flux indicator 2 and serve as rotor position indicators, each giving a momentary indication of the angular position of the "N" pole of the rotor as the rotor revolves. These lights are connected in parallel with lights 8' through 15' respectively, and in cooperation therewith serve to correlate the angular position of the rotor with the amplitudes and polarities of the two phases 4 and 5 as portrayed by the phase indicator 2.

The method of driving the various moving parts of the demonstrator, the details of commutator 33, and the wiring diagram are shown in Fig. 5. The rotor 45 is mounted on shaft 46 which is coupled to shaft 32 by means of a flexible coupling 85. Cylinder 31 and the rotating parts of commutator 33 (Fig. 2) are mounted on shaft 32. Both shafts 32 and 46 are driven by motor 86 through worm 87 and gear 88 to rotate rotor 45 and the revolving parts of the commutator in a clockwise direction as seen in Fig. 5. The speed at which the demonstrator operates may be controlled by motor speed controller 89. The demonstrator may also be operated by hand by de-energizing the motor and pushing crank 90 inward to engage gears 91 and 92.

The belt 27 (Fig. 2) is so mounted on cylinder 31 that when the "N" pole of the rotor points to one of the rotor position indicator lights such, for example, as light 10''' a dividing line between opaque and clear sections of the belt is opposite the corresponding phase indicator light 10'.

The commutator 33 comprises a stationary disc of insulating material 80 having eight contacts about 10° in length and spaced at 45° intervals about the circumference of a circle. Shaft 32 passes through stationary disc 80 and is grounded by ring 82 and contact 83. Revolving contact 81 is mounted on shaft 32 and acts to ground the contacts on disc 80 in succession as the shaft rotates. Lamps 8' and 8''' are connected in parallel between the ungrounded terminal of the secondary winding of transformer 84, the primary of which is connected to a source of A. C. power, and the 0° contact on disc 80. Similarly parallel connected lamps 9'—9''' through 15'—15''' are connected between the ungrounded terminal of the transformer secondary and the remaining contacts respectively in a clockwise direction. Lamp 16' is connected in parallel with lamp 8' since both lamps represent similar points on waves 4 and 5. With this arrangement, as shafts 32 and 46 rotate, the rotor position indicator lamps 8' through 15' and phase indicator lamp 8''' through 15''' are successively energized to indicate the point on the cycle of the two-phase voltage corresponding to the position of the "N" pole of the rotor.

The switching of lamps 63 through 70 to produce the results already described in connection with Figs. 3 and 6 is accomplished by the disc 93 and associated contacts of commutator 33. The disc 93 is made of insulating material and is mounted on shaft 32 so that it rotates therewith. The disc carries six conducting contact strips extending about 15° in either direction from the 0°, 90°, 135°, 180°, 270° and 315° points on the circumference of a circle centered on the center of the disc. Each of these contact strips is conductively connected to the grounded shaft 32. Two stationary contacts 94 and 95, having a 90° spaced relationship, are arranged to engage the contact strips of disc 93 and are so positioned that contact 94 is in the center of the 0° contact strip when the "N" pole of rotor 45 is directly vertical, or under salient pole 41. With this arrangement all lamps are energized when rotor 45 is within 15° of its vertical or horizontal position, lamps 65, 66, 69 and 70 are energized when the rotor is within 15° of its 45°–225° position, and lamps 63, 64, 67 and 68 are energized when the rotor is within 15° of its 135°–315° position, as required.

The brightness of flux intensity lights 71', 72', 73' and 74' is controlled by variable resistance device 96, which comprises resistance element 97 and sliding contact 98 movable over the length of the resistance element by crank 99 and connecting rod 100. Contact 98 is connected to the ungrounded terminal of the secondary winding of transformer 84, while lamps 72' and 74' are connected in parallel between the left hand terminal of resistor 97 and ground, and lamps 71' and 73' are connected between the right hand terminal and ground. With this arrangement lamps 72' and 74' have full brightness and lamps 71' and 73' have minimum brightness when slider 98 is in its extreme left hand position, as shown in Fig. 5. Rotation of crank 99 through 90° moves slider 98 to the center of resistor 97 resulting in equal but less than full brightness in all four lamps. Rotation of crank 99 through an additional 90° reverses the first condition and produces full brightness in lamps 71' and 73' with minimum brightness in lamps 72' and 74'. Since each lamp must change from full to minimum brightness in 90° of rotation of rotor 45 the crank 99 must revolve at twice the speed of shaft 46. This speed increase is provided by gears 101 and 102 which have a ratio of 2:1.

With reference to the commutator of Fig. 5 and the cam shown in Fig. 4, the angular extent of the contacts and cam surfaces given in the specific embodiments described are not critical values but merely representative of a satisfactory design.

What I claim is:

1. A training apparatus for demonstrating the operation of a synchronous motor comprising a wave illustrating device and a flux illustrating device, said wave illustrating device comprising a panel of opaque material, a zero axis on said panel equal in length to one wavelength of the polyphase voltages or currents to be illustrated and formed by rendering said panel transparent along said axis, said panel also being rendered transparent along the outlines of one complete cycle of each of a plurality of waves of the same frequency but different phases and coextensive with said zero axis to represent the polyphase currents or voltages to be illustrated, a light source located behind said panel and arranged to illuminate the area of said panel including said waves, an endless belt supported between rotatable cylinders and interposed between said light source and said panel, said belt having alternate opaque and transparent sections equal in length to one wavelength of said waves and having sufficient area to cover the area of said panel containing said waves, means for driving one of said cylinders and means for preventing slippage between said belt and said driven cylinder, said flux illustrating device comprising a stator element made of a transparent material and having an outer ring portion and a plurality of poles extending radially from said ring portion toward its center whereby said stator element conforms to the cross-section perpendicular to the shaft of a synchronous motor armature core of the salient pole type, a rotor element made of a transparent material and shaped to conform to the cross-section perpendicular to the shaft of a synchronous motor field core of the salient pole type, means for revolving said rotor element relative to said stator element, a disc of opaque material positioned behind said stator and rotor elements, said disc being perforated beneath said stator element and beneath the poles of rotor element when aligned with the poles of said stator element, individually controllable electrically energized light sources designed to illuminate from the rear each of the sectoral areas of said disc bounded by the center lines of adjacent stator poles, shutter means located between said light sources and the perforations of said disc under said stator and rotor poles for controlling the passage of light through these perforations, and separate means operated by said rotor revolving means for controlling said shutters and the energization of said light sources so as to introduce light through the perforations of said disc into said transparent stator and rotor elements in a pattern determined by the angular position of said rotor element and conforming to the magnetic flux distribution in the armature and field cores of a similar synchronous motor for a similar position of its rotor, and fixed coupling means between said rotor revolving means and said cylinder driving means whereby the said wave illustrating device always shows the amplitudes and polarities of the said waves necessary to produce the flux distribution shown by the said flux illustrating device.

2. Apparatus as claimed in claim 1 in which additional electrically energized light sources arranged to introduce light into the edge of said stator element opposite each stator pole are provided, and means operated from said rotor revolving means for controlling the energization of said additional light sources to control the intensity of each additional light source in an inverse relationship to the angular displacement of the associated stator pole and the nearest rotor pole.

3. Apparatus as claimed in claim 2 in which a plurality of rotor position indicator electric lights are spaced at regular intervals around said flux illustrating device and a similar number of corresponding wave position indicator electric lights are distributed at equal intervals beneath the illustrated waves in said wave illustrating device, means connecting corresponding pairs of lights in the two groups in parallel and switching means operated by said rotor revolving means for successively energizing said pairs of lights as the rotor revolves.

4. A device for demonstrating the operation of a synchronous motor, said device comprising a stator element made of a transparent material and having an outer ring portion and a plurality of poles extending radially from said ring portion toward its center whereby said stator element conforms to the cross-section perpendicular to the shaft of a synchronous motor armature core of the salient pole type, a rotor element made of a transparent material and shaped to conform to the cross-section perpendicular to the shaft of a synchronous motor field core of the salient pole type, means for revolving said rotor element relative to said stator element, a disc of opaque material positioned behind said stator and rotor elements, said disc being perforated beneath said stator element and beneath the poles of said rotor element when aligned with the poles of said stator element, individually controllable electrically energized light sources designed to illuminate from the rear each of the sectoral areas of said disc bounded by the center lines of adjacent stator poles, shutter means located between said light sources and the perforations of said disc under said stator and rotor poles for controlling the passage of light through these perforations, and separate means operated by said rotor revolving means for controlling said shutters and the energization of said light sources so as to introduce light through the perforations of said disc into said transparent stator and rotor elements in a pattern determined by the angular position of said rotor element and conforming to the magnetic flux distribution in the armature and field cores of a similar synchronous motor for a similar position of its rotor.

5. Apparatus as claimed in claim 4 in which additional electrically energized light sources arranged to introduce light into the edge of said stator element opposite each stator pole are provided, and means operated from said rotor revolving means for controlling the energization of said additional light sources to control the intensity of each additional light source in an inverse relationship to the angular displacement of the associated stator pole and the nearest rotor pole.

HARRY M. TUCKER.

REFERENCES CITED

The following references are of record in the file of this patent:

UNITED STATES PATENTS

| Number | Name | Date |
| --- | --- | --- |
| 2,203,594 | Daugherty | June 4, 1940 |
| 2,236,217 | Manuel | Mar. 25, 1941 |

FOREIGN PATENTS

| Number | Country | Date |
| --- | --- | --- |
| 587,544 | Germany | Nov. 4, 1935 |
| 328,010 | Great Britain | Apr. 16, 1930 |